United States Patent
Ramachandran et al.

(10) Patent No.: US 9,933,956 B2
(45) Date of Patent: Apr. 3, 2018

(54) SYSTEMS AND METHODS FOR IMPLEMENTING STRETCH CLUSTERS IN A VIRTUALIZATION ENVIRONMENT

(71) Applicant: Nutanix, Inc., San Jose, CA (US)

(72) Inventors: Parthasarathy Ramachandran, Palo Alto, CA (US); Brian Byrne, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 516 days.

(21) Appl. No.: 14/586,614

(22) Filed: Dec. 30, 2014

(65) Prior Publication Data

US 2016/0188232 A1    Jun. 30, 2016

(51) Int. Cl.
  *G06F 9/455* (2006.01)
  *G06F 3/06* (2006.01)
  *G06F 11/14* (2006.01)

(52) U.S. Cl.
  CPC ............ *G06F 3/0619* (2013.01); *G06F 3/065* (2013.01); *G06F 3/067* (2013.01); *G06F 3/0661* (2013.01); *G06F 11/1484* (2013.01)

(58) Field of Classification Search
  None
  See application file for complete search history.

(56) References Cited

U.S. PATENT DOCUMENTS

| | | | |
|---|---|---|---|
| 8,326,798 B1* | 12/2012 | Driscoll | G06F 17/30082 707/610 |
| 8,589,574 B1 | 11/2013 | Cormie et al. | |
| 8,769,105 B2 | 7/2014 | LaCapra | |
| 8,850,528 B2 | 9/2014 | Van Biljon et al. | |
| 2014/0258616 A1 | 9/2014 | Aizman et al. | |
| 2014/0330787 A1 | 11/2014 | Modukuri et al. | |
| 2015/0006663 A1* | 1/2015 | Huang | G06F 13/4221 709/213 |
| 2015/0324217 A1* | 11/2015 | Shilmover | G06F 9/45558 718/1 |

OTHER PUBLICATIONS

International Search Report and Written Opinion dated Mar. 11, 2016 for corresponding PCT Patent Application No. PCT/US2015/068178, 12 pages.

* cited by examiner

*Primary Examiner* — Kenneth Tang
(74) *Attorney, Agent, or Firm* — Vista IP Law Group, LLP

(57) ABSTRACT

Described is an approach for implementing stretching datastores/clusters in a virtualization environment. In this approach, data replication can be performed across multiple namespace protocols. In addition, control can be made of the granularity of the data replication such that different combinations of data subsets are replicated from one cluster to another.

30 Claims, 12 Drawing Sheets

SYSTEMS AND METHODS FOR IMPLEMENTING STRETCH CLUSTERS IN A VIRTUALIZATION ENVIRONMENT

CROSS REFERENCE TO RELATED APPLICATIONS

The present application is related to U.S. application Ser. No. 14/270,705, filed on May 6, 2014, entitled "SYSTEM AND METHODS FOR DYNAMICALLY ADJUSTING BETWEEN ASYNCHRONOUS AND SYNCHRONOUS DATA REPLICATION POLICIES IN A NETWORKED VIRTUALIZATION ENVIRONMENT", U.S. application Ser. No. 14/027,576, filed on Sep. 16, 2013, entitled "SYSTEM AND METHODS FOR DYNAMICALLY ADJUSTING BETWEEN ASYNCHRONOUS AND SYNCHRONOUS DATA REPLICATION POLICIES IN A NETWORKED VIRTUALIZATION ENVIRONMENT", U.S. application Ser. No. 14/019,139, filed on Sep. 5, 2013, entitled "SYSTEM AND METHODS FOR PERFORMING DISTRIBUTED DATA REPLICATION IN A NETWORKED VIRTUALIZATION ENVIRONMENT", U.S. Pat. No. 8,601,473, entitled "ARCHITECTURE FOR MANAGING I/O AND STORAGE FOR A VIRTUALIZATION ENVIRONMENT", and U.S. application Ser. No. 14/586,700, filed on even date herewith, entitled "METHOD AND SYSTEM FOR ACCESSING DATA BETWEEN DIFFERENT VIRTUAL DISK FORMATS IN A VIRTUALIZATION ENVIRONMENT" which are all hereby incorporated by reference in their entirety.

FIELD

This disclosure concerns a mechanism for performing data replication in a networked virtualization environment.

BACKGROUND AND SUMMARY

Data replication involves replicating data located at a source location to a destination location. There may be any number of reasons that it is desirable to perform data replication. One possible reason to implement data replication is for the purpose of disaster recovery, where data replicated from the source to the destination may be later recovered at the destination when the source undergoes failure.

However, the process of performing data replication is made much more complicated in virtualization environments. In virtualization environments, both the source and destination systems may be implemented as clusters, where each cluster is a collection of datastores having shared resources and possibly a shared management interface. The goal of the data replication is to "stretch" the clusters so that all or part of the datastore from the source cluster is replicated to the destination cluster—so that the datastore appears to be stretched across the two clusters.

The problem is that there may be a number of different configuration differences and incompatibilities between the source and destination clusters and datastores. For example, the namespace protocol at the source datastore may be quite different from the namespace protocol at the destination datastore. Moreover, it may also be desirable to change the granularity and quantity of the data from the source cluster that is replicated to the destination cluster. With these problems, it often becomes very difficult to perform data replication in real-world virtualization environment, particularly with respect to the specific data replication policies and granularities desired by administrators of those environments.

Embodiments of the present invention provide a method, system, and computer program product for stretching datastores/clusters in a virtualization environment. Some embodiments provide an approach to perform data replication across multiple namespace protocols. In addition, some embodiments can control the granularity of the data replication such that different combinations of data subsets are replicated from one cluster to another.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Figure 1:
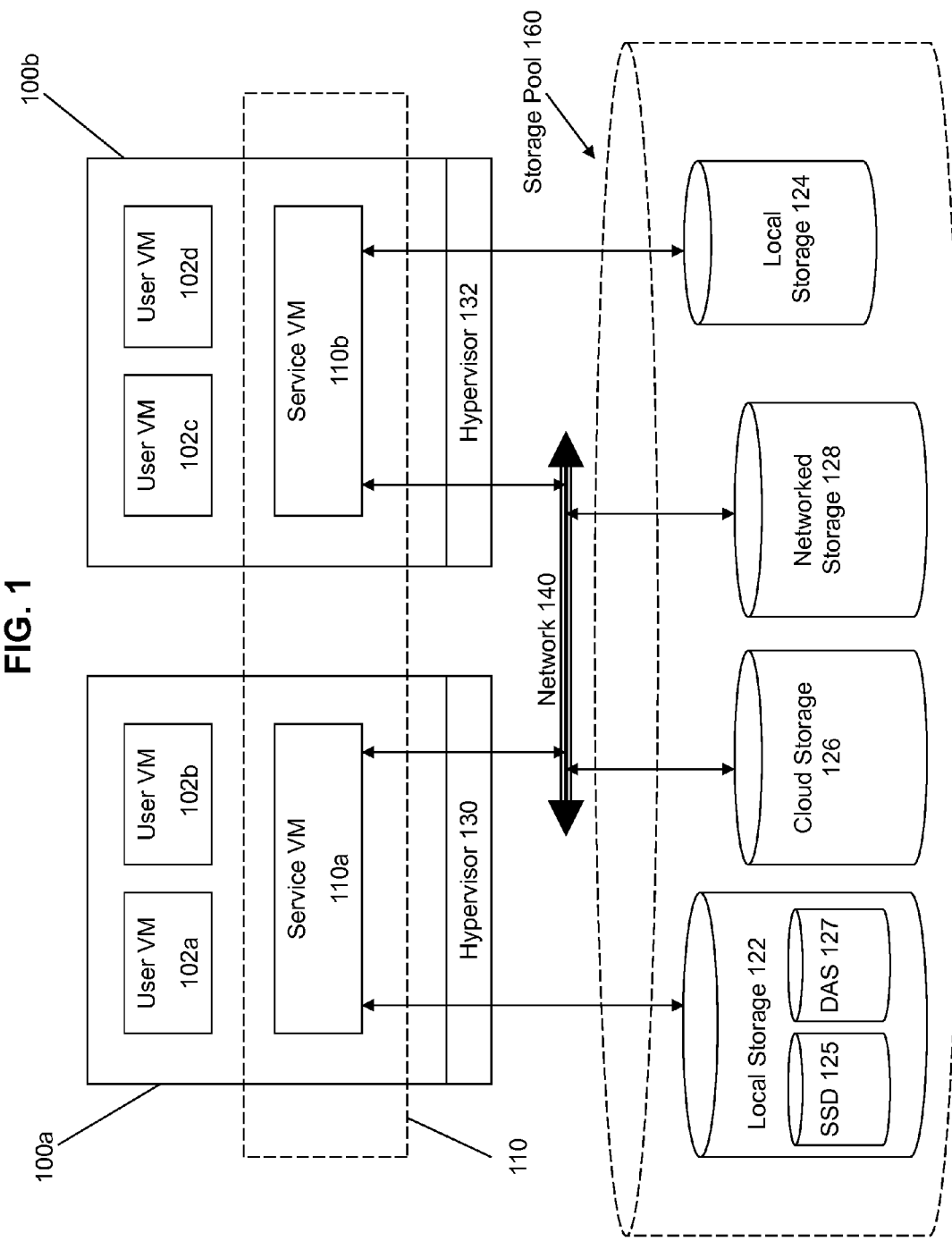
FIG. 1 illustrates a networked virtualization environment for storage management according to some embodiments of the invention.

Embodiments of the present invention provide a method, system, and computer program product for stretching datastores/clusters in a virtualization environment. Some embodiments provide an approach to perform data replication across multiple namespace protocols. In addition, some embodiments can control the granularity of the data replication such that different combinations of data subsets are replicated from one cluster to another.

It is noted that various embodiments of the invention are described hereinafter with reference to the figures. It should also be noted that the figures are not necessarily drawn to scale, that the figures are only intended to facilitate the description of the embodiments, and that the figures are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

The embodiments of the invention pertain to a virtualization environment, where a "virtual machine" or a "VM" operates in the virtualization environment. A VM refers to a specific software-based implementation of a machine in the virtualization environment, in which the hardware resources of a real computer (e.g., CPU, memory, etc.) are virtualized or transformed into the underlying support for the fully functional virtual machine that can run its own operating system and applications on the underlying physical resources just like a real computer. Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them. Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are often architected as diskless computers ("application servers") that communicate with a set of networked storage appliances ("storage servers") via a network, such as a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems.

Storage devices comprise one type of physical resources that can be managed and utilized in a virtualization environment. For example, VMWare is a company that provides products to implement virtualization, in which networked storage devices are managed by the VMWare virtualization software to provide the underlying storage infrastructure for the VMs in the computing environment. The VMWare approach implements a file system (VMFS) that exposes storage hardware to the VMs. The VMWare approach uses VMDK "files" to represent virtual disks that can be accessed by the VMs in the system. Effectively, a single volume can be accessed and shared among multiple VMs. Microsoft is another company that offers a virtualization product, known as the Hyper-V product. This type of virtualization product is often used to implement SMB type file shares to store its underlying data.

FIG. 1 illustrates an example networked virtualization environment for implementing storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM" or "Controller VM". This is the "Storage Controller" in the currently described networked virtualization environment for storage management. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QOS) functions, encryption and compression. The networked virtualization environment massively parallelizes storage, by placing a storage controller—in the form of a Service VM—at each hypervisor, and thus makes it possible to render enough CPU and memory resources to achieve the aforementioned optimizations.

Additional details regarding networked virtualization environments for storage management are described in U.S. Pat. No. 8,601,473, entitled "Architecture for Managing I/O and Storage for a Virtualization Environment", which is hereby incorporated by reference in its entirety.

Data replication involves replicating data located at a source to a destination. This may be performed, for example, to implement a disaster recovery process, where data replicated from the source to the destination may be later recovered at the destination when the source undergoes failure. The networked virtualization environment illustrated in FIG. 1 may be representative of the source networked virtualization environment or destination networked virtualization environment for purposes of data replication. A source service VM may be utilized to perform data replication for its corresponding user VM. The source service VM does so by identifying the file(s) to be replicated for a particular user VM and coordinating with one or more destination service VMs for performing replication of the file(s) at the destination. At the destination, one or more destination service VMs are assigned to the source service VM for receiving file(s) to be replicated and storing those files. Additional details for performing such distributed data replication may be found in co-pending application Ser. No. 14/019,139, filed on Sep. 5, 2013, entitled "System and Methods for Performing Distributed Data Replication in a Networked Virtualization Environment", which is incorporated by reference in its entirety.

Figure 2:
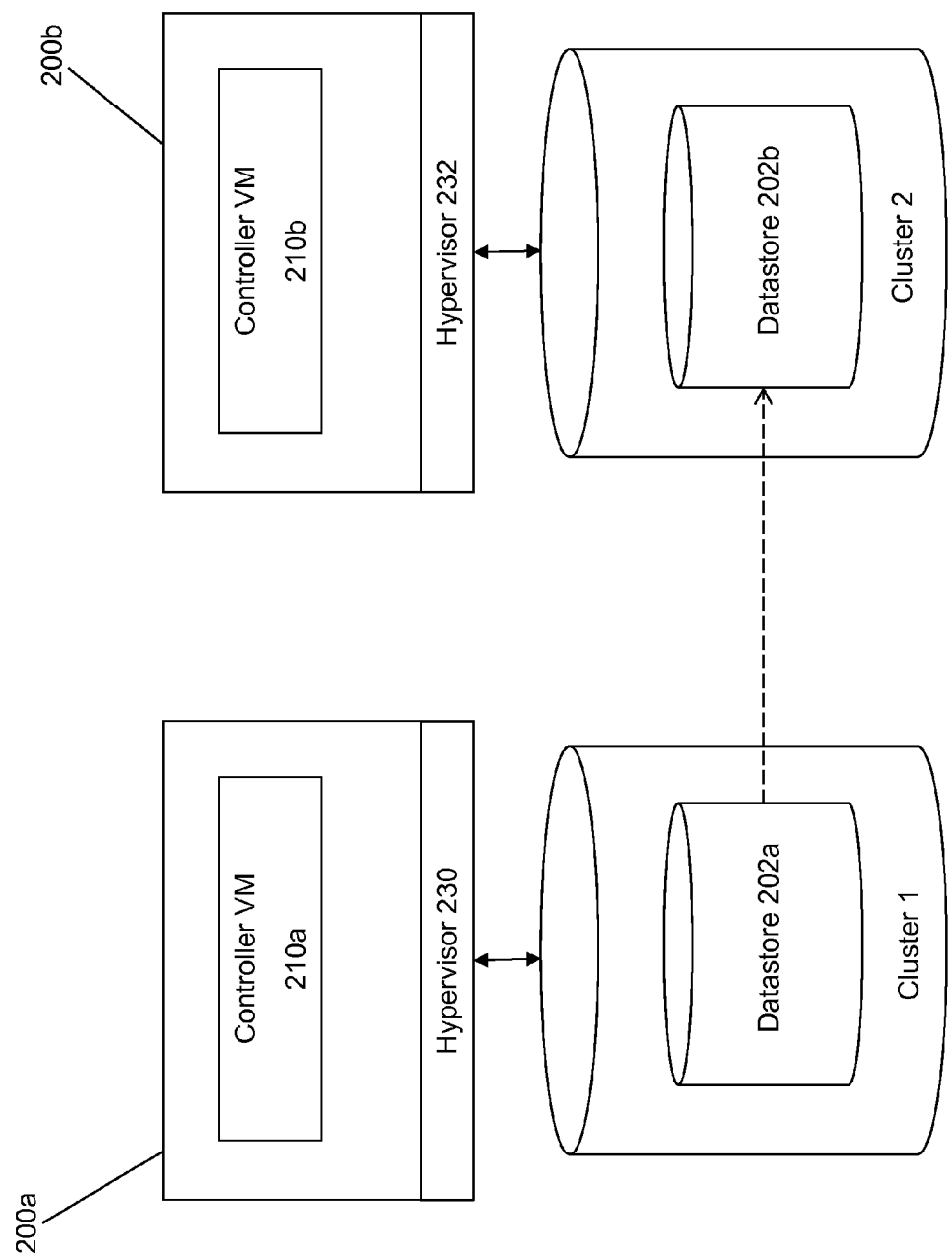
FIG. 2 provides an illustration of an approach to implement stretch clusters in a virtualization environment according to some embodiments of the invention.

FIG. 2 provides an illustration of an approach to implement stretch clusters in a virtualization environment according to some embodiments of the invention. Here, a source datastore 202a in a first cluster 1 is to be replicated as a replicated datastore 202b in a second cluster 2. This replication may be necessary for any of multiple possible purposes. For example, the data replication may be necessary to implement disaster recovery, where the source datastore 202a corresponds to a primary data storage location and the destination datastore 202b corresponds to a failover data storage location.

The issue here is that the source datastore 202a and the destination datastore 202b are implemented using different namespace types. For example, assume that the source datastore 202a is implemented using SMB (e.g., because its corresponding virtualization system implements a Hyper-V hypervisor 230). Further assume that the destination datastore 202b is implemented using an entirely different namespace protocol, such as NFS or iSCSI (e.g., because its corresponding virtualization system implements a hypervisor 232 that differs from the hypervisor 230 of the source system).

Figure 3:
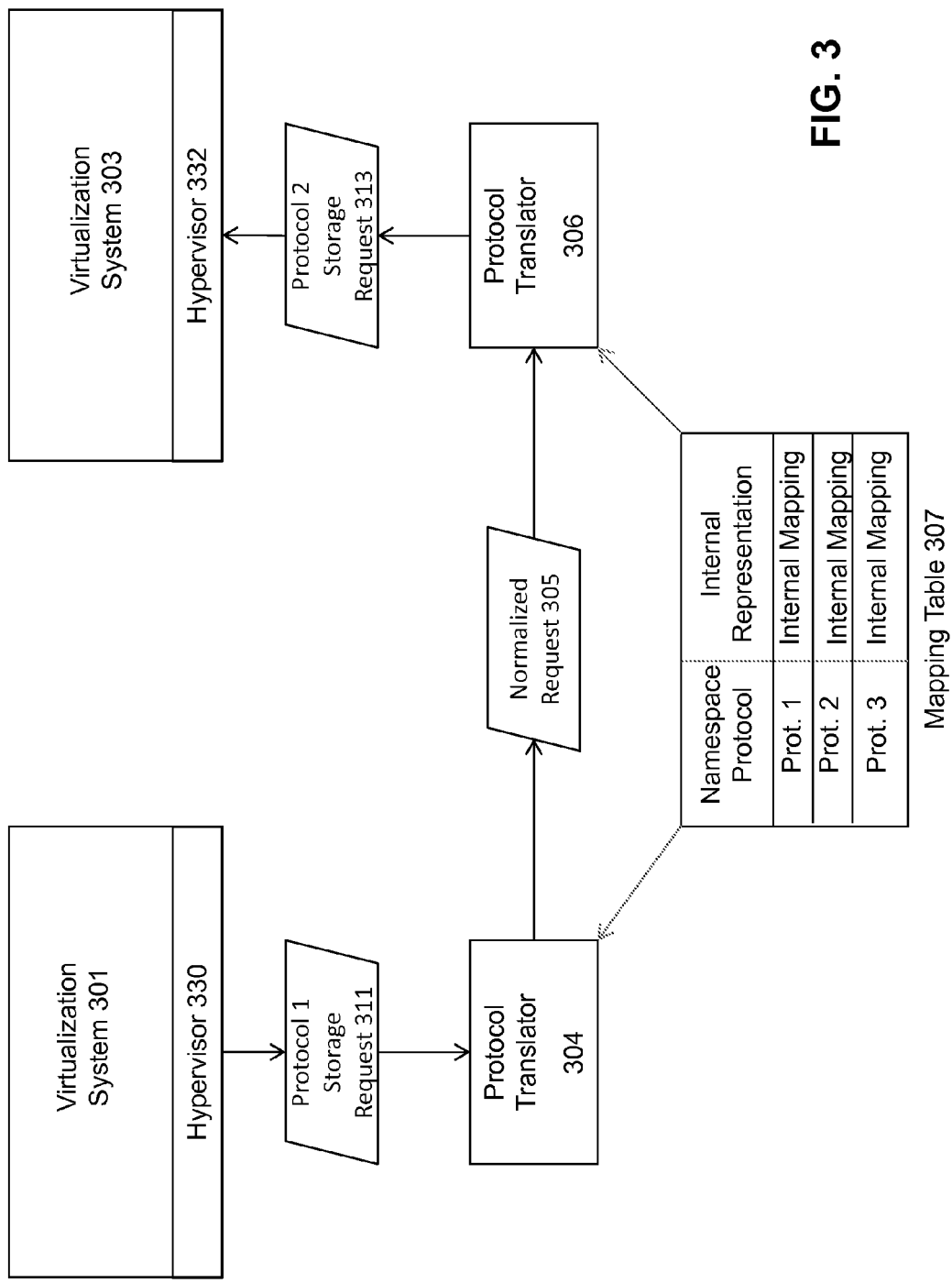
FIG. 3 shows an approach that can be taken to implement stretch clusters in this situation according to some embodiments of the invention.

FIG. 3 shows an approach that can be taken to implement stretch clusters in this situation according to some embodiments of the invention. Here, a request 311 in the appropriate protocol for the source datastore is received from the source virtualization system, 301. This request 311 is specific to the namespace protocol of the source datastore. For example for a SMB datastore, the request 311 itself would correspond to the appropriate SMB protocol and syntax.

A protocol translator 304 is employed to translate the original request 311 into an intermediate and/or normalized format. In some embodiments, the intermediate format corresponds to an internal data representation understandable by the storage controller of the system. Here, since the storage controller functionality is implemented using controller VMs, the internal representation would correspond to any internal data representations that is used by the controller VMs.

A protocol translator 306 is employed at the destination to translate the intermediate/normalized request 305 into the format appropriate or the namespace at the destination datastore.

A mapping table 307 can be employed by protocol translator 304 to translate the original request 311 from the source namespace format into the normalized request 305. The same or similar mapping table can also be used by protocol translator 306 to translate the normalized request 305 into the final request 313. The mapping table 307 comprises any information necessary to map from the different namespaces in the system to each other and/or to any internal representations used by the system storage controllers (e.g., the controller VMs).

Figure 4:
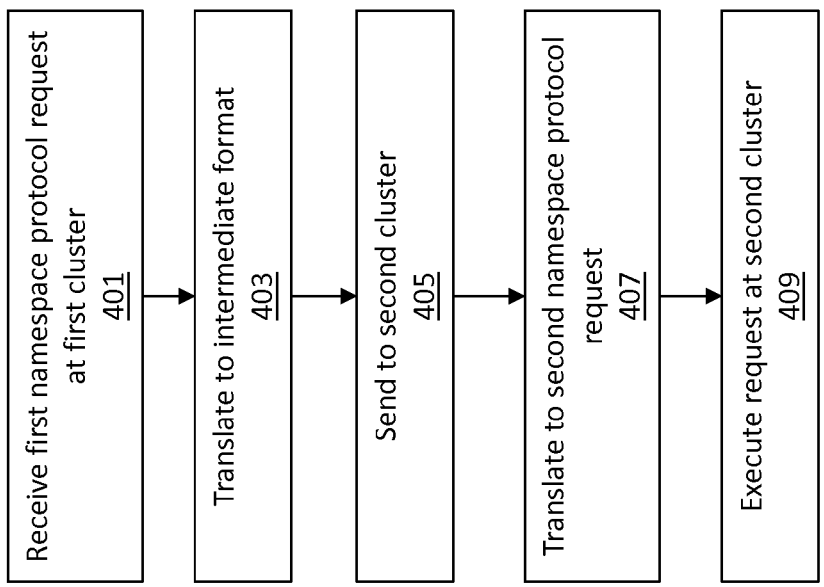
FIG. 4 shows a flowchart that illustrates the process of FIG. 3.

FIG. 4 shows a flowchart that illustrates this process. At 401, a first request is received for the source datastore, where the first request is in the appropriate format for the namespace type for the first datastore.

The problem is that the destination datastore has a completely different namespace type. To address this, at 403, the first request is translated into an intermediate/normalized format. As noted above, a mapping table can be employed to translate the first request into the intermediate/normalized format.

Next, at 405, the intermediate/normalized request is sent to the location of the destination datastore. This location is likely in a second cluster, which is different from the cluster that holds the source datastore. In the current scenario, since the second datastore is in a completely different namespace type from the first datastore, the underlying virtualization technology may also be different, e.g., where the hypervisor at the source system is different from the hypervisor at the destination system in terms of its type, manufacture, or underlying technology.

At 407, the intermediate/normalized request is then translated into the appropriate namespace protocol for the destination datastore. Thereafter, at 409, the request is executed at the destination datastore.

The replication of the data may thus require the data to be re-formatted and/or reconfigured as necessary so that it can fit within the structure of the destination datastore. For example, the data to be replicated at the original source datastore may be in a first namespace type at a first inode number. An "inode" is an index node that corresponds to a data structure to represent a filesystem object, such as a file or a directory. The destination datastore may correspond to a different namespace type from the source datastore, and the inode numbers at the source datastore may not have any relevance to the inode numbers used at the destination datastore. Therefore, to satisfy the replication request, the file/directory structure of the source data may need to be modified into the appropriate file/directory structure that exists at the destination datastore. In addition, the original inode number for the data would be changed to correspond to the appropriate inode number that is usable at the destination data store.

The incompatibilities that may need to be addressed are not limited only to namespace type differences between the source datastore and the destination datastore. The granularity and/or quantity of the data to be replicated may also be different between the datastore and the destination datastore. The below description describes examples of replication from a source node to a destination node. It is noted that replication occurs from a first cluster to a second cluster, and therefore the term "node" can correspond to one or more nodes at a given cluster.

Figure 5:
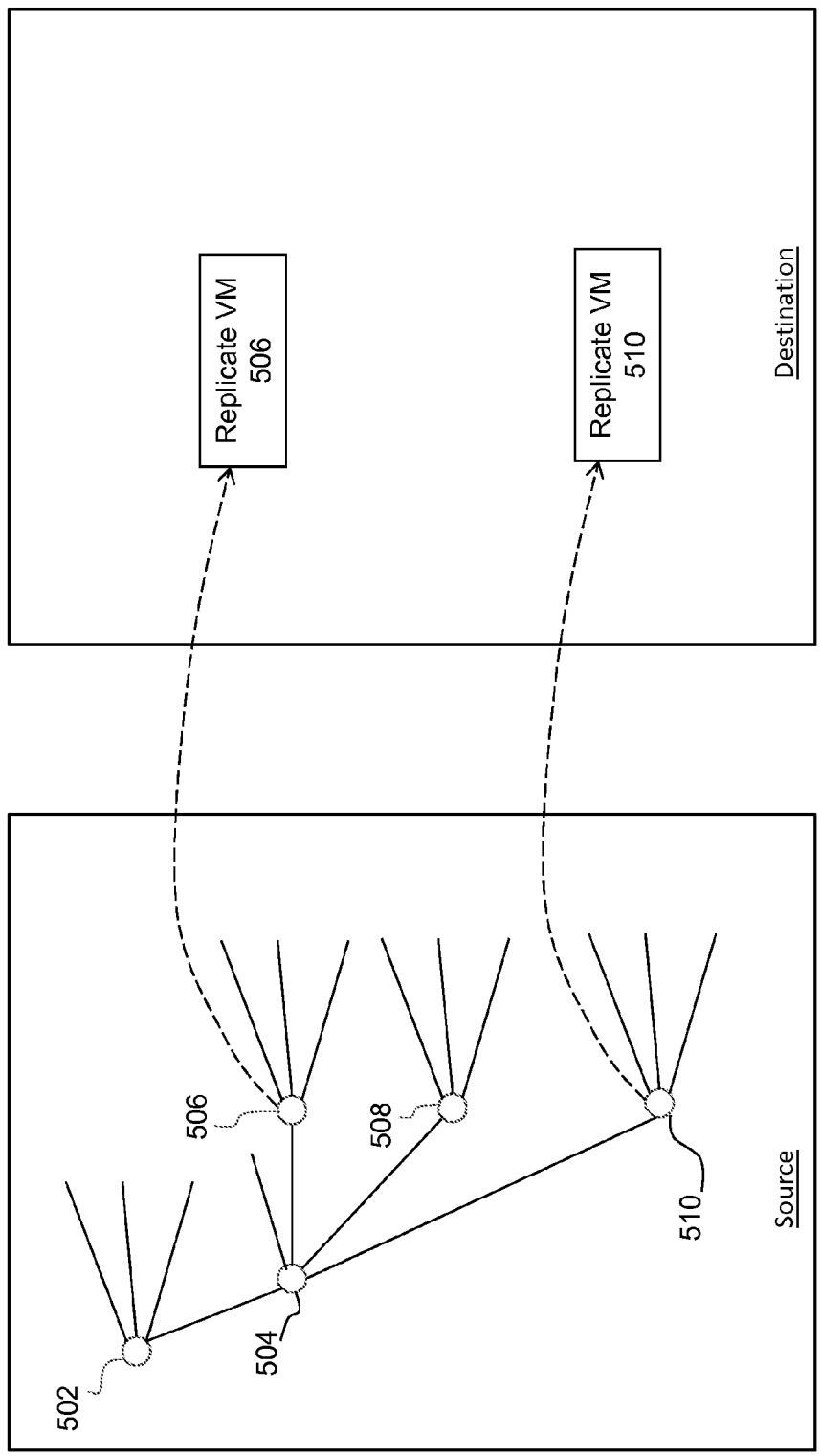
FIG. 5 shows an example structure of source data to be replicated.

FIG. 5 shows an example structure of some source data that is to be replicated. Here, the source data is in a hierarchical form, having a root node 502, a node 504 that is a child of node 502, and nodes 506, 508, and 510 that branch off from node 504. Consider if it is desired to replicate only a portion of the source data. For example, assume that nodes 506 and 510 correspond to VMs for which a replication policy is established that requires them to be replicated to a destination system, where the policy does not specify the same level of replication for the other data within the source datastore. This may occur, for example, if there are quality of service (QoS) guarantees for users of the system that may affect different items of data differently and/or create performance requirements that require data items to be handled differently to allow the system to meet performance expectations. In this situation, it may very well be the case that the data for certain VMs will have a replication policy that dictates different handling compared to the replication requirements for other VMs.

Figure 6:
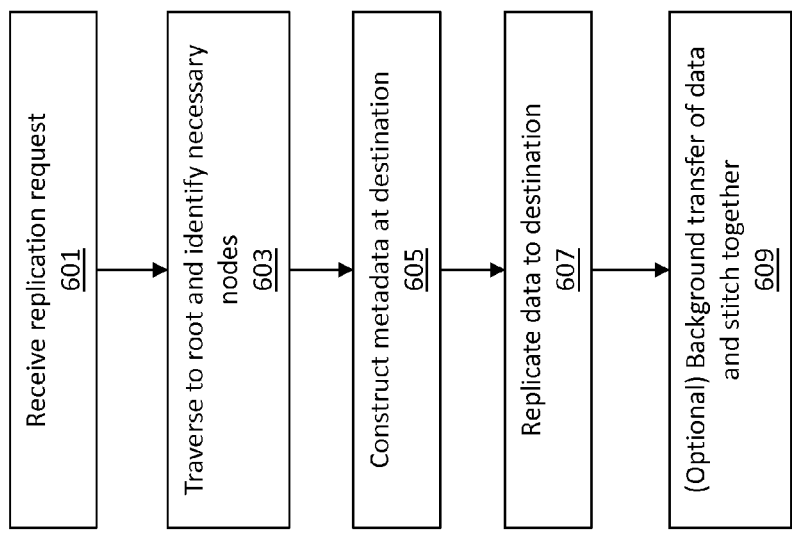
FIG. 6 shows an approach that can be taken to perform replication according to some embodiments of the invention.

FIG. 6 shows an approach that can be taken to perform this type of replication according to some embodiments of the invention. At 601, a request is received to implement replication from a source datastore to a destination datastore.

It is possible that the request may pertain to synchronization of an arbitrary portion of the source datastore (and not the entirety of the source datastore). Therefore, the replication approach needs to understand which portions of the source datastore needs to be processed in order to fulfill the replication request. At 603, a traversal is made from the specific leaf nodes identified for the replication to the root of the data in the source datastore. This is performed to determine all of the intermediate nodes which were not specifically identified for replication, but which may need to be processed to ensure that proper dependencies are handled for the replication.

Next, replication will proceed to replicate the desired data at the destination datastore (e.g., using the process described above to send the replication request from the source to the destination in the appropriate formats). To implement the replication at the destination, at 605, the destination will first construct the metadata for the replicated data. This is implemented by modifying the metadata of the destination data to account for the new directories and/or files to be added to the destination datastore. For example, the directory file object that tracks the directories and files in the destination datastore would be modified as necessary to account for the inclusion of the replicated data. In addition, any other metadata managed by the storage system to account for data at the destination datastore would also be modified at this point.

Thereafter, at 607, the actual data would be replicated to the destination datastore. This may involve an immediate copy of all of the to-be-replicated data from the source datastore to the destination datastore. The data would be placed into the appropriate locations configured for that data (based at least upon the modifications made to the metadata).

As an optional step, at 609, a multi-phase approach can be taken to replicate the data, where only a portion of the data to be replicated is immediately copied, and where the bulk of the data is copied in the background at a later point in time. This approach can be taken to reduce the immediate latency of the replication operation. For example, as described in more detail below, only newly modified data can be immediately replicated, whereas source data that has not been modified is replicated later on.

Figure 7:
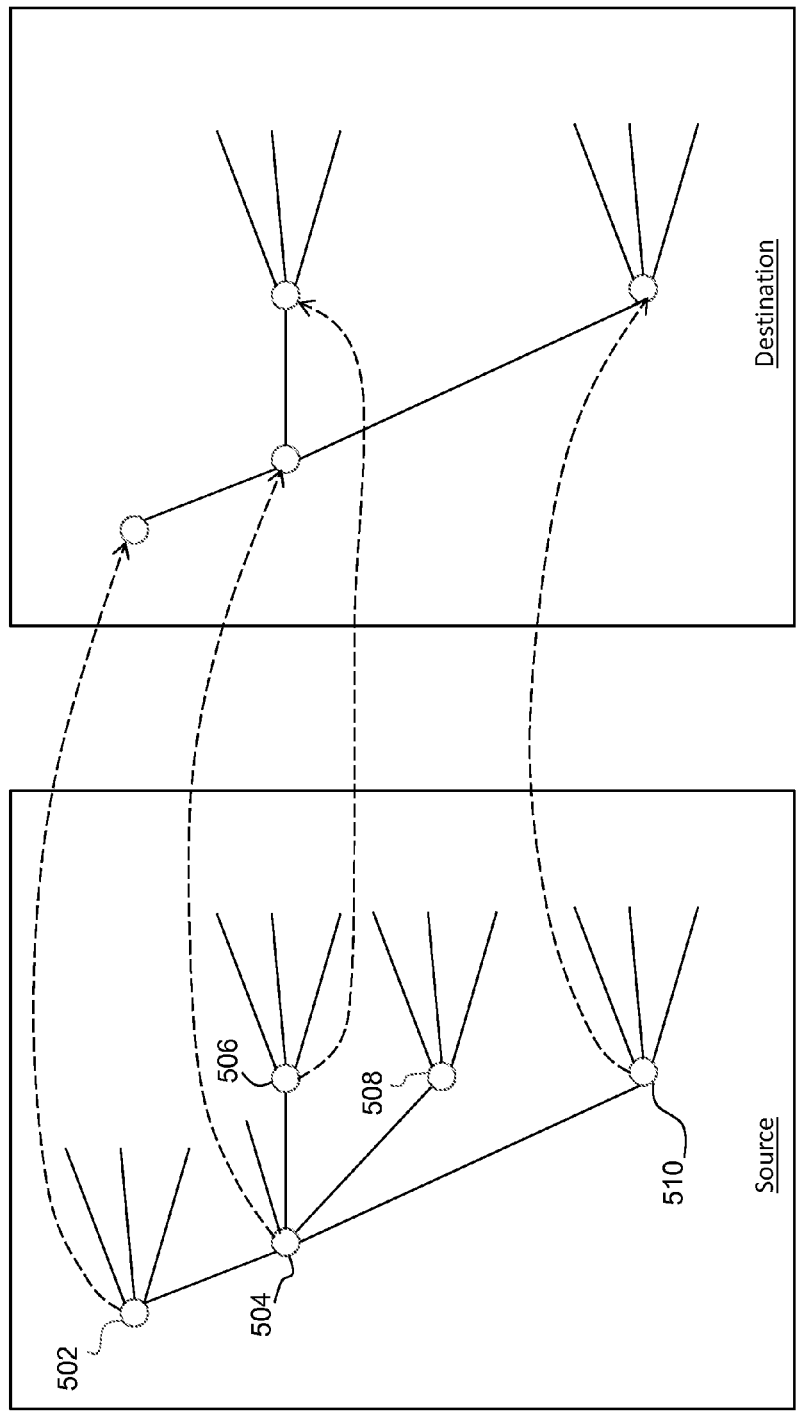
FIG. 7 illustrates an application of a process to perform the replication shown in FIG. 5.

FIG. 7 illustrates an application of this process to perform the replication shown in FIG. 5. Recall that only nodes 506 and 510 have been specifically identified in the source datastore to be replicated to the destination datastore. However, by traversing from these nodes through the data hierarchy, it can be seen that these nodes have dependencies that may exist through intermediate node 504 back upwards in the hierarchy to the root node 502. Therefore, when replication occurs, in addition to nodes 506 and 510, their parent nodes 502 and 504 will also be identified for replication. Any files within these directories/nodes that are required for consistency purposes will also be identified for replication. The first intermediate synchronization will involve construction of metadata for these objects at the destination datastore. The next stage of the replication will then involve replication of the data for these objects to be replicated to the destination datastore.

Two modes of data replication can be used for the data replication: asynchronous data replication and synchronous data replication. Asynchronous data replication occurs where a write operation for a piece of data at a source is committed as soon as the source acknowledges the completion of the write operation. Replication of the data at the destination may occur at a later time after the write operation at the source has been committed. Synchronous data replication occurs where a write operation for a piece of data at a source is committed only after the destination has replicated the data and acknowledged completion of the write operation. Thus, in a synchronous data replication mode, a committed write operation for data at the source is guaranteed to have a copy at the destination.

Asynchronous data replication is advantageous in certain situations because it may be performed with more efficiency due to the fact that a write operation for data at the source can be committed without having to wait for the destination to replicate the data and acknowledge completion of the write operation. However, asynchronous data replication may result in potential data loss where the source fails prior to the replication of data at the destination.

Synchronous data replication guarantees that data loss will not occur when the source fails because the write operation for data is not committed until the destination has verified that it too has a copy of the data. However, having to wait for data to be written at both the source and the destination before committing a write operation may lead to latency as well as strain on system resources (e.g., CPU usage, memory usage, network traffic, etc.).

In some embodiments, data replication involves setting a fixed data replication policy (either synchronous or asynchronous). A fixed synchronous data replication policy may be defined by various timing parameters such as the time taken for performing the data replication process or the wait time between successive data replication processes. In some situations, the fixed synchronous data replication policy may dictate the exact timing parameters for data replication such that performance of synchronous data replication under a particular policy must be made using the exact timing parameters of that particular policy. In other situations, the fixed synchronous data replication policy may provide a guideline for data replication such that performance of synchronous data replication under a particular policy attempts to meet the timing parameters of that particular policy without necessarily exactly meeting those timing parameters.

By setting a fixed data replication policy, the manner in which data replication occurs remains static regardless of the changing nature of the system (e.g., source networked virtualization environment or destination networked virtualization environment). System parameters such as the amount of data being replicated or the amount of resources being consumed by the source or destination may vary over time. Thus, fixing the data replication policy for a system fails to account for the dynamic nature of system parameters and may lead to inefficiencies where the system parameters change substantially or frequently over the course over system operation.

Setting a fixed data replication policy may be efficient where the source and destination operate at a steady resource consumption rate and the amount of data to be replicated remains steady. However, where the rate of resource consumption or amount of data to be replicated exhibits volatility, the fixed data replication policy may lead to the underutilization of resources when additional resources are available or where the amount of data to be replicated significantly decreases. Similarly, inefficiency may occur where the fixed data replication policy overutilizes resource availability when fewer resources are available or where the amount of data to be replicated significantly increases.

With the introduction of networked virtualization environments for storage management, various configurations may exist for performing data replication. At any given time, any number of sources may be servicing any number of destinations. For example, a one-to-one configuration may exist between a source and a destination.

Figure 8:
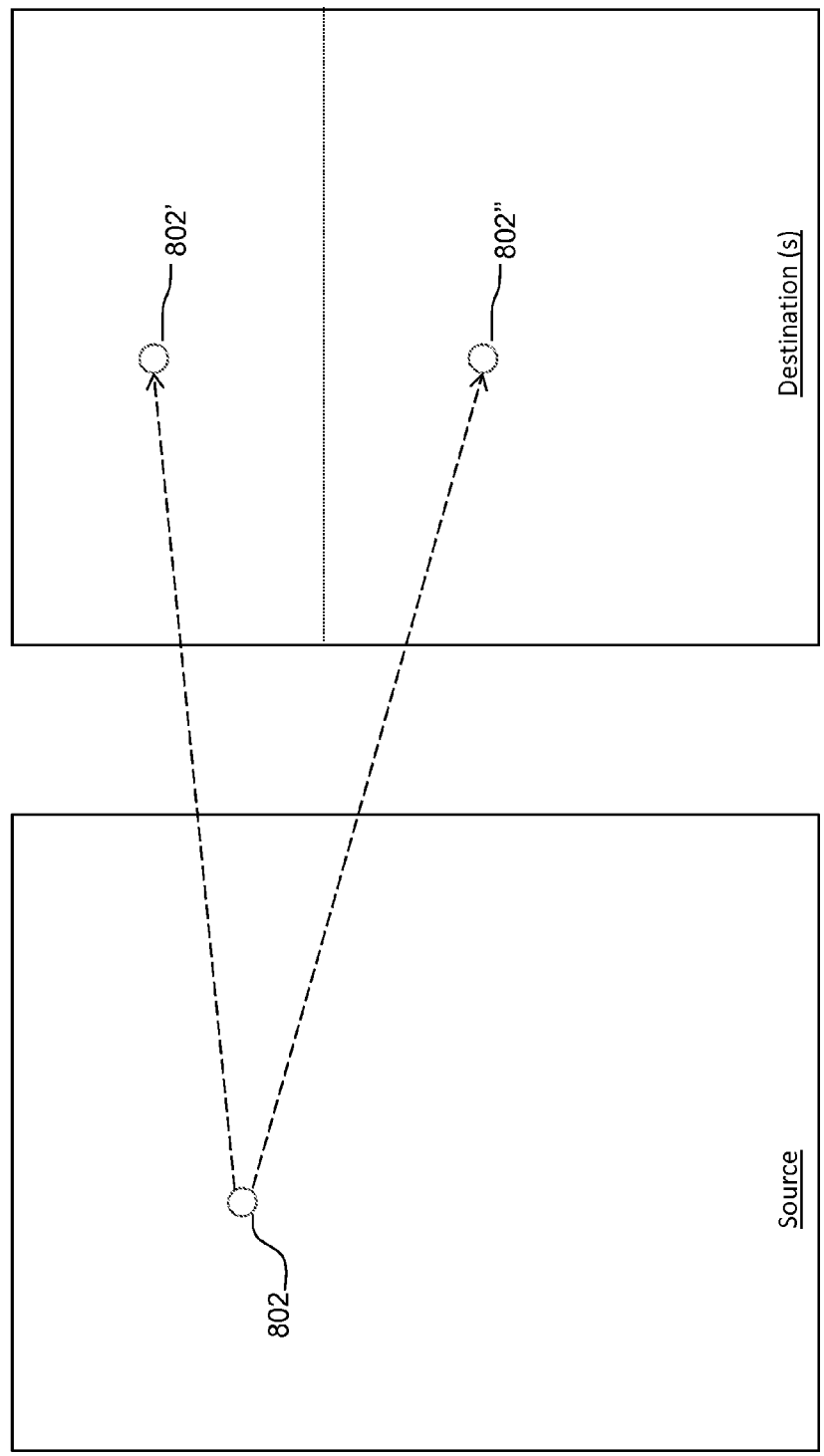
FIG. 8 illustrates a 1-to-many relationship for data replication.

As shown in FIG. 8, it is possible for a 1-to-many relationship to exist, where a source set of data 802 to be replicated to multiple destination datastores 802' and 802". This may be used, for example, to take a single set (or subset) of data, and break that data into even smaller subsets at the multiple destinations. Of course, the original set/subset of data can be merely replicated in its entirety to the multiple destinations.

Figure 9:
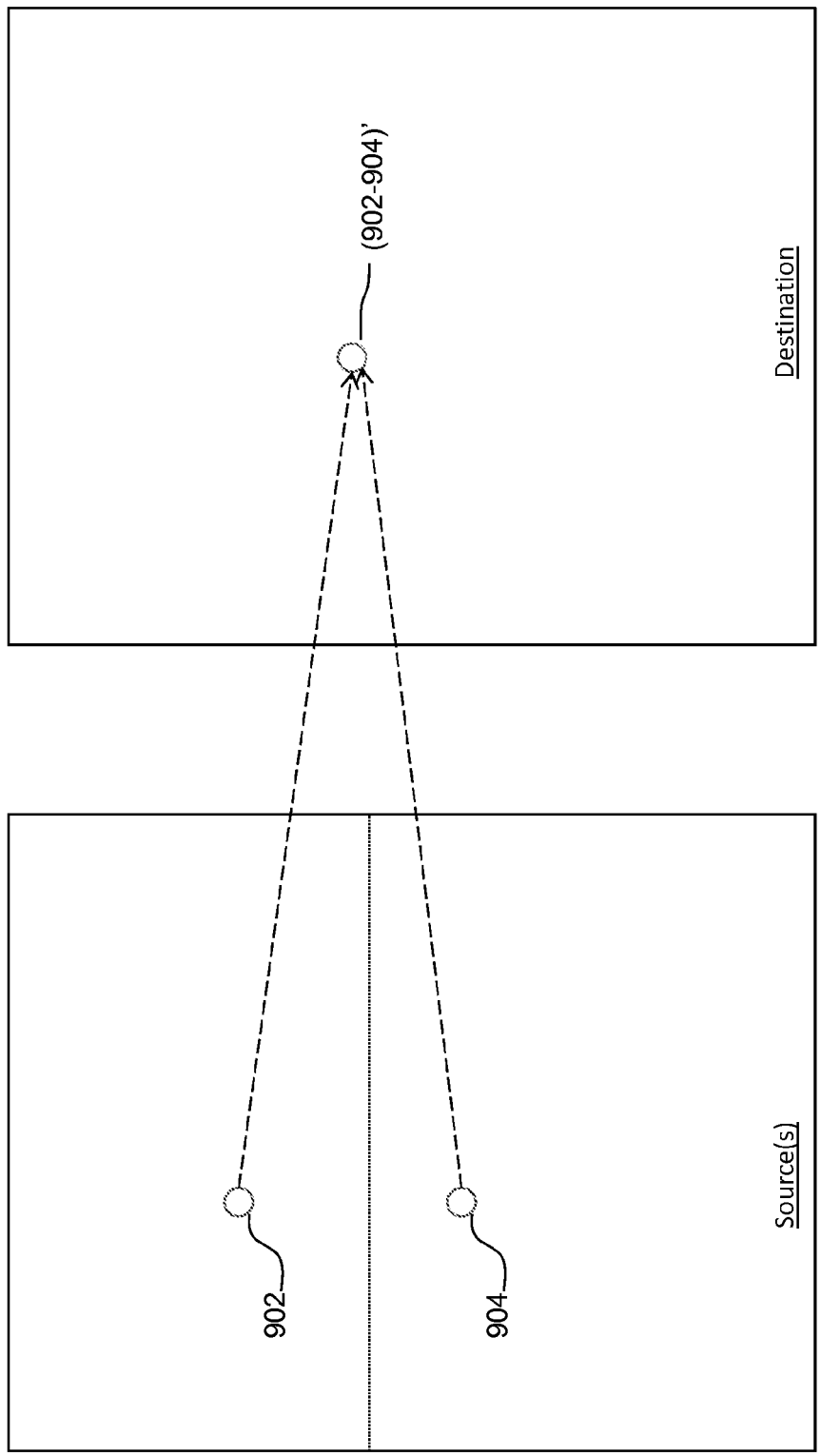
FIG. 9 illustrates a many-to-1 relationship for data replication.

As shown in FIG. 9, it is also possible for a many-to-1 relationship to exist, where multiple source sets of data 902/904 are replicated to a single destination (902/904)'. This situation may be used, for example, to replicate multiple small subsets of data to form a single larger set of data at the destination. It is noted that in the many-to-1 scenario, there could be multiple different mount points at the destination (and not just one mount point as shown in FIG. 9).

Figure 10:
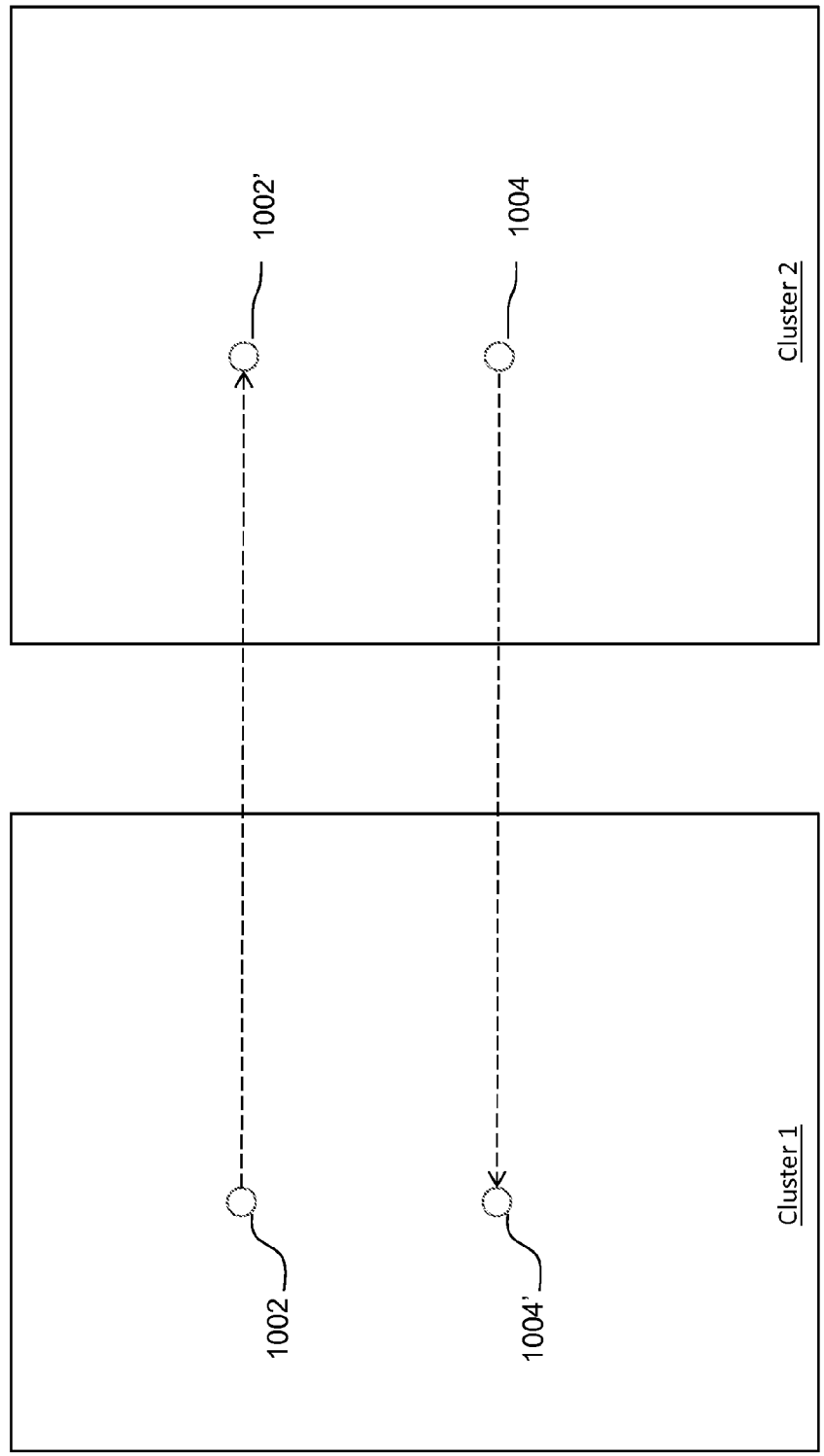
FIG. 10 illustrates an example of active-to-active replication.
Figure 11:
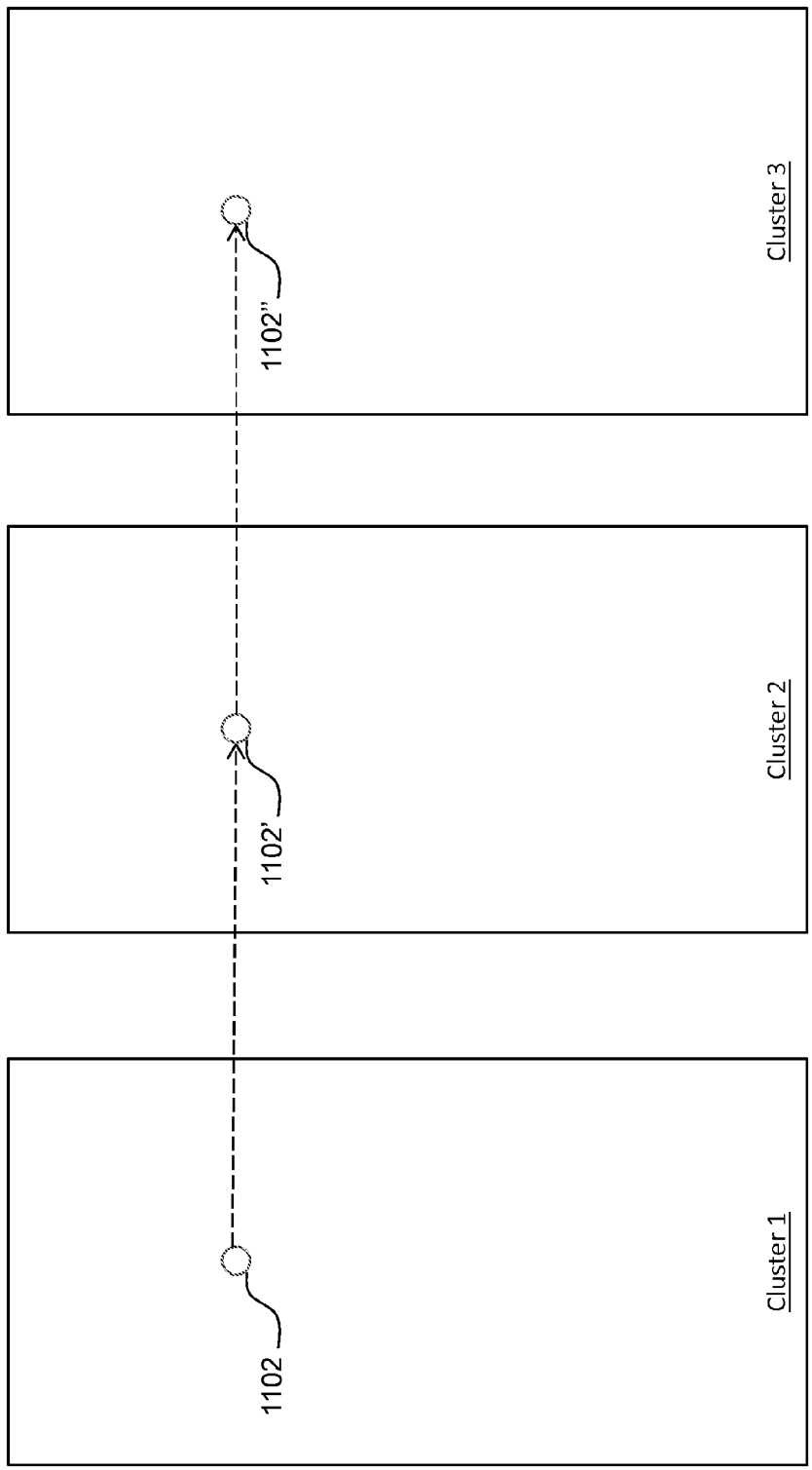
FIG. 11 illustrates data replication in a chained relationship.

FIG. 10 shows another possible architecture, where active-to-active replication occurs. In this situation, each datastore will replicate some or all of its data to the other datastore. Here, the data 1002 is replicated from cluster 1 to cluster 2 as data 1002'. However, data 1004 is replicated from cluster 2 to cluster 1 as data 1004'. It is important to note, however, that each destination may additionally be a source to any number of other destinations in a chained arrangement, as shown in FIG. 11 where the data object 1102 at cluster 1 is replicated to cluster 2, and the replicated data object 1102' is in turn replicated to cluster 3 as data 1102".

In these configurations, parameters associated with data replication may vary over time, with the number of source(s) and destination(s) changing for the different data objects/VMs. Even when the numbers for the data replication remains the same at the source, a corresponding destination may experience various parameter changes that decrease the efficiency of using a fixed data replication policy.

Because of the various different configurations that may be used for performing data replication and the changing nature of parameters associated with the networked virtualization environments, various inefficiencies may arise when a fixed data replication policy is used. The dynamic nature of networked virtualization parameters such as the amount of data being replicated or the amount of resources available to and being consumed by the source service VM or destination service VM may vary over time regardless of whether an asynchronous data replication policy or synchronous data replication policy is used. As such, using a fixed data replication policy will necessarily lead to the inefficiencies described above.

In some embodiment, dynamically adjustments can be made between synchronous and asynchronous data replication policies. As used herein, the term dynamically adjusting between synchronous and asynchronous data replication policies may refer to the act of switching from an asynchronous data replication policy to a synchronous data replication policy or vice versa and may additionally refer to the act of transitioning between an asynchronous data replication policy with a first set of timing parameters to an asynchronous data replication policy with a different set of timing parameters.

By dynamically adjusting between different data replication policies, the fluctuations in system parameters during operation may be accounted for and the utilization of system resources may be made more optimal and efficient. For example, where the resources available to a service VM at the source or destination are heavily utilized (due to the number of user VMs being serviced or amount of data being replicated), the data replication policy may shift from a synchronous data replication policy to an asynchronous data replication policy. Alternatively, the data replication policy may shift from a synchronous data replication policy with a short replication time to a data replication policy with a longer replication time to account for the heavy resource utilization.

As another example, where the resources available to a service VM at the source or destination are underutilized (due to the number of user VMs being serviced or amount of data being replicated), the data replication policy may shift from an asynchronous data replication policy to a synchronous data replication policy. Alternatively, the data replication policy may shift from a synchronous data replication policy with a long replication time to a data replication policy with a shorter replication time to account for the low resource utilization. The process for dynamically adjusting between data replication policies may initiate under various different circumstances. In some circumstances, the process may begin at periodic intervals, such as every two hours. Alternatively, the process may begin when a resource utilization level at either the source or the destination rises above or falls below a particular threshold. As another example, the process for dynamically adjusting between data replication policies may initiate whenever a service VM loses or gains additional user VMs.

An administrator or user of the user VM may establish a preferred data replication policy. In some embodiments, the data replication policy may be a synchronous data replication policy, where every write operation of data for the user VM is not committed until the data is replicated and the write operation is acknowledged at the destination. In some other embodiments, the data replication policy may be an asynchronous data replication policy, where a write operation of data for the user VM is committed once the source has acknowledged the write operation. The asynchronous data replication policy may indicate a time period for performing data replication. For example, the asynchronous data replication policy may indicate that data replication is to be performed in five minutes. Alternatively, the asynchronous data replication policy may indicate a time period between successive data replications. For example, the synchronous data replication policy may indicate that a five minute period of time passes between successive replication steps. Additionally, the asynchronous data replication policy may indicate a total time period for data replication. For example, the synchronous data replication policy may indicate that data replication is to be performed for five minutes with a five minute pause between successive replication steps.

A load level may then be determined by the source service VM. In some embodiments, the load level may indicate the current amount of resources being utilized by the source service VM. The load level being utilized by the source service VM may be important in determining how the data replication policy should be adjusted because it indicates the amount of additional load the source service VM can take on or the amount of load the source service VM needs to be reduced by in order to perform at an optimal level.

In other embodiments, the load level may indicate the current amount of resources being utilized by the source service VM as well as the amount of resources being utilized by the destination service VM. The load level being utilized by the destination service VM may be important in determining how the data replication policy should be adjusted because it indicates the amount of additional load the destination service VM can take on or the amount of load the destination service VM needs to be reduced by in order to perform at an optimal level.

In some embodiments, service VMs may monitor their own resources usage. In this situation, the source service VM may determine its load level by consulting its monitored resource usage and the source service VM may determine the load level at the destination service VM by communicating with the destination service VM to determine the amount of resource usage at the destination. In some other embodiments, a central controller may monitor the resource usage of both the source service VM and the destination service VM, and the source service VM may communicate with the central controller to determine the load level for both the source and the destination.

The load level at either the source service VM, destination service VM or their combination may include various resource usage parameters such as, for example, CPU usage, memory usage, and network bandwidth utilization.

In some embodiments, the shift in replication time from the current data replication policy to the desired data replication policy may involve lengthening or shortening the time for performing data replication. In other embodiments, the shift in replication time from a current data replication policy to a desired data replication policy may involve lengthening or shortening the time between successive data replications.

In some embodiments, the approach provides for transitioning from an asynchronous data replication policy to a synchronous data replication policy without having to first place the destination (e.g., destination vDisk) into the same state as the source (e.g., source vDisk). Initially, a snapshot of the source vDisk is taken at a first point in time where the state of the source vDisk snapshot is the same as the destination vDisk prior to the data replication policy transitioning from an asynchronous data replication policy to a synchronous data replication policy. In some embodiments, the service VM facilitating data replication at the source may determine that a snapshot should be taken based on a user indicating that the data replication policy should be transitioned from an asynchronous data replication policy to a synchronous data replication policy. The snapshot is then taken at the point in time where the state of the source vDisk is equivalent to state of the destination vDisk prior to the data replication policy transitioning from an asynchronous data replication policy to a synchronous data replication policy. In some other embodiments, the service VM facilitating data replication at the source may determine that a snapshot should be taken based on the service VM at the source losing connection with the service VM at the destination. The snapshot is taken at the last point in time where the source vDisk and the destination vDisk have the same state (e.g., point in time immediately preceding the loss of connection).

The snapshot taken of the source vDisk provides the state of destination vDisk at the last point in time prior to the data replication policy transitioning from an asynchronous mode to a synchronous mode. After the first point in time, the source vDisk may continue to perform I/O operations that may change the contents of the source vDisk. Because an asynchronous data replication policy is used to replicate data between the source vDisk and destination vDisk after the first point in time, but prior to the data replication policy transitioning into a synchronous data replication policy, I/O operations performed on the source vDisk during that time are not immediately replicated at the destination vDisk. Thus, at a second point in time when the data replication policy transitions from the asynchronous data replication policy to the synchronous data replication policy, the changes made to the source vDisk after the first snapshot are not yet replicated at the destination vDisk.

At this second point in time, a second snapshot of the source vDisk is taken. The second snapshot provides the state of the source vDisk at the point where the data replication policy transitions from an asynchronous data replication policy to a synchronous data replication policy.

In order to allow for the destination vDisk to begin replicating data from the source vDisk in a synchronous manner without having to first place the destination vDisk into the same state as the source vDisk, the service VM facilitating data replication at the source provides enough metadata to the service VM facilitating data replication at the destination to allow for a shell destination vDisk to be generated. Thus, metadata is provided from the source to the destination. The metadata provided from the source to the destination includes the structural parameters of the source vDisk, but does not identify the content changes that occurred between the first point in time and the second point in time. Using the metadata provided by the source, a shell destination vDisk that is structurally similar to the source vDisk at the time of the second snapshot, but does not have all of the contents of the source vDisk may be generated at the destination. The shell destination vDisk is later populated with the contents of the source vDisk through a background process.

Once the shell destination vDisk has been generated at the destination, any write operations performed on the source vDisk are synchronously replicated at the shell destination vDisk. Although the shell destination vDisk does not yet have all the contents of the source vDisk, it is structurally similar to the source vDisk and so any write operations performed at the source vDisk after the second point in time may be replicated on the shell destination vDisk. For example, the shell destination vDisk may have an empty structure with a same number data blocks as the source vDisk, and may perform a write operation to any of those empty data blocks to replicate a write operation that occurs at the source vDisk.

By generating the shell destination vDisk, synchronous data replication between the source and the destination may begin immediately without having to first place the destination vDisk into the same state as the source vDisk. This significantly decreases the amount of delay incurred during a transition from an asynchronous data replication policy to a synchronous data replication policy.

The differences between the snapshot at the first point in time and the snapshot at the second point in time are then provided to the destination as a background process. Those differences are then used to populate the shell destination vDisk so that the shell destination vDisk may have the same state as the source vDisk. In some embodiments, the differences between the snapshot at the first point in time and the snapshot at the second point in time may be provided in a single operation (e.g., batch process). In other embodiments, the differences between the snapshot at the first point in time and the snapshot at the second point in time may be provided over several different operations.

By providing the differences between the snapshot at the first point in time and the second point in time as a background process after synchronous data replication has begun rather than providing the differences as a foreground process prior to initiating synchronous data replication, significant reduction in delay may be achieved while at the same time providing a destination vDisk that has the same state as the source vDisk.

Further details regarding an example approach that can be taken to implement data replication using synch/asynch processing is described in co-pending U.S. application Ser. No. 14/270,705, filed on May 6, 2014, entitled "System and Methods for Dynamically Adjusting Between Asynchronous and Synchronous Data Replication Policies in a Networked Virtualization Environment" which is hereby incorporated by reference in its entirety.

The above-described techniques for implementing stretch clusters can be applied even when the source and destination datastores have the same namespace protocols. This may occur due to different storage-related properties between the source and the destination. For example, when the same namespace type is on both ends (such as NFS on both ends), the above-described mapping may still occur due to the need for a new Mode at the destination end.

Therefore, what has been described is an improved approach for implementing stretching clusters in a virtualization environment, where data replication can be performed across multiple namespace protocols. In addition, control can be made of the granularity of the data replication such that different combinations of data subsets are replicated from one cluster to another.

System Architecture

Figure 12:
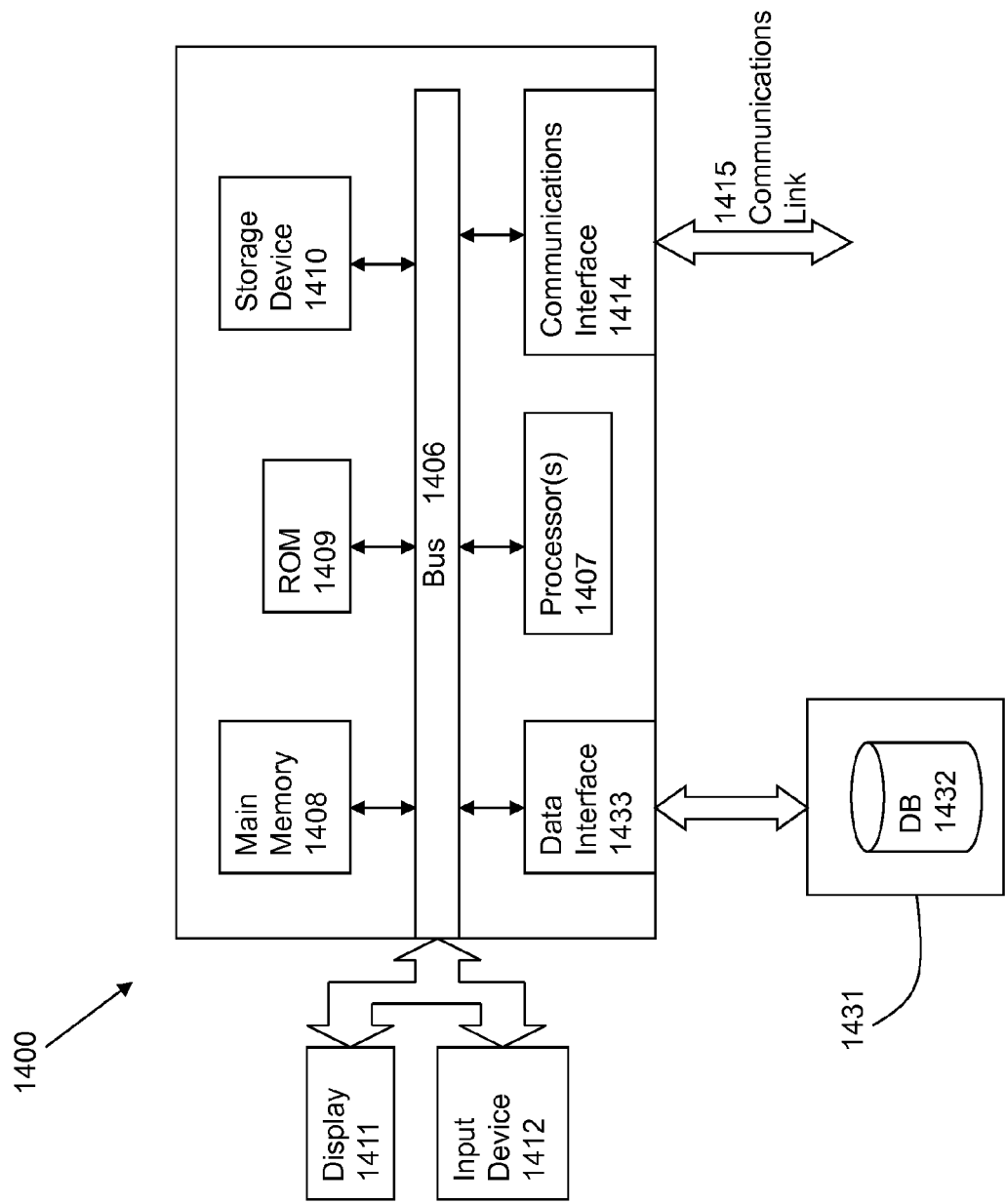
FIG. 12 is a block diagram of an illustrative computing system suitable for implementing an embodiment of the present invention.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in storage medium 1431 may be accessed through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for replicating data in a virtualization environment, comprising:
   receiving a request to replicate data of a first namespace type from a first node to a second node, wherein the data is to be replicated to the second node as a second namespace type, wherein the first namespace type and the second namespace type are different namespace protocols implemented within the virtualization environment;
   translating, via a mapping table, the request to replicate the data of the first namespace type into a normalized format that is implemented by a storage system, the mapping table comprising information to map the data from the first namespace type to the normalized format;
   translating, via the mapping table, the normalized format into another request corresponding to the second namespace type, the mapping table comprising information to map the data from the normalized format to the second namespace type; and
   replicating the data to the second node in the second namespace type via the another request.

2. The method of claim 1, wherein the first node corresponds to a first virtualization node, the second node corresponds to a second virtualization node, and the data corresponds to storage in a virtualization environment comprising virtual disks.

3. The method of claim 1, wherein a controller virtual machine performs namespace translations.

4. The method of claim 1, wherein a mapping structure is used to perform namespace translations.

5. The method of claim 1, wherein translations occur to replicate the data into a different storage architecture.

6. The method of claim 1, wherein a portion of a storage hierarchy at the first node is not replicated to the second node or is replicated to a different hierarchical location at the second node.

7. The method of claim 1, wherein multiple nodes replicate the data to a single node.

8. The method of claim 1, further comprising:
   traversing a hierarchy for the data at the first node to identify necessary nodes;
   constructing metadata at the second node corresponding to the necessary nodes; and
   replicating the data to the second node in correspondence to the metadata.

9. The method of claim 1, wherein the first node replicates data to multiple other nodes.

10. A computer program product embodied on a non-transitory computer readable medium, the non-transitory computer readable medium having stored thereon a sequence of instructions which, when executed by a processor causes the processor to execute a method for performing a process for replicating data in a virtualization environment, the process comprising:
    receiving a request to replicate data of a first namespace type from a first node to a second node, wherein the data is to be replicated to the second node as a second namespace type, wherein the first namespace type and the second namespace type are different namespace protocols implemented within the virtualization environment;
    translating, via a mapping table, the request to replicate the data of the first namespace type into a normalized format that is implemented by a storage system, the mapping table comprising information to map the data from the first namespace type to the normalized format;
    translating, via the mapping table, the normalized format into another request corresponding to the second namespace type, the mapping table comprising information to map the data from the normalized format to the second namespace type; and
    replicating the data to the second node in the second namespace type via the another request.

11. The computer program product of claim 10, wherein the first node corresponds to a first virtualization node, the second node corresponds to a second virtualization node, and the data corresponds to storage in a virtualization environment comprising virtual disks.

12. The computer program product of claim 10, wherein a controller virtual machine performs protocol translations.

13. The computer program product of claim 10, wherein a mapping structure is used to perform protocol translations.

14. The computer program product of claim 10, wherein translations occur to replicate the data into a different storage architecture.

15. The computer program product of claim 14, wherein a portion of a storage hierarchy at the first node is not replicated to the second node or is replicated to a different hierarchical location.

16. The computer program product of claim 14, wherein multiple nodes replicate the data to a single node.

17. The computer program product of claim 14, wherein the computer readable medium further comprises instructions which, when executed by the processor causes the processor to execute the process comprising:
    traversing a hierarchy for the data at the first node to identify necessary nodes;
    constructing metadata t the second node corresponding to the necessary nodes; and
    replicating the data to the second node in correspondence to the metadata.

18. The computer program product of claim 10, wherein the first node replicates data to multiple other nodes.

19. A system, comprising:
    a computer processor to execute a set of program code instructions;
    a memory to hold the program code instructions, in which the program code instructions comprises program code to perform: receiving a request to replicate data of a first namespace type from a first node to a second node, wherein the data is to be replicated to the second node as a second namespace type, wherein the first namespace type and the second namespace type are different namespace protocols implemented within a virtualization environment; translating, via a mapping table, the request to replicate the data of the first namespace type into a normalized format that is implemented by a storage system, the mapping table comprising information to map the data from the first namespace type to the normalized format; translating, via the mapping table, the normalized format into another request corresponding to the second namespace type, the mapping table comprising information to map the data from the normalized format to the second namespace type; and replicating the data to the second node in the second namespace type via the another request.

20. The system of claim 19, wherein the first node corresponds to a first virtualization node, the second node corresponds to a second virtualization node, and the data corresponds to storage in a virtualization environment comprising virtual disks.

21. The system of claim 19, wherein a controller virtual machine performs protocol translations.

22. The system of claim 19, wherein a mapping structure is used to perform protocol translations.

23. The system of claim 19, wherein translations occur to replicate the data into a different storage architecture.

24. The system of claim 19, wherein a portion of a storage hierarchy at the first node is not replicated to the second node or is replicated to a different hierarchical location.

25. The system of claim 19, wherein multiple nodes replicate the data to a single node.

26. The system of claim 19, further comprising program code instructions having program code to perform: traversing a hierarchy for the data at the first node to identify necessary nodes; constructing metadata t the second node corresponding to the necessary nodes; and replicating the data to the second node in correspondence to the metadata.

27. The system of claim 19, wherein the first node replicates data to multiple other nodes.

28. The method of claim 1, wherein the first namespace type is a Server Message Block (SMB) namespace protocol.

29. The computer program product of claim 10, wherein the first namespace type is a Server Message Block (SMB) namespace protocol.

30. The system of claim 19, wherein the first namespace type is a Server Message Block (SMB) namespace protocol.

* * * * *